United States Patent

[11] 3,620,328

| [72] | Inventors | Herbert D. Coburn<br>Dallas;<br>Gilbert H. Kelly, Irving, both of Tex. |
|---|---|---|
| [21] | Appl. No. | 838,982 |
| [22] | Filed | July 3, 1969 |
| [45] | Patented | Nov. 16, 1971 |
| [73] | Assignee | Texas Instruments Incorporated<br>Dallas, Tex. |

[54] CONTROL SYSTEM
8 Claims, 6 Drawing Figs.

[52] U.S. Cl. .................................................. 181/.5 VM,
 91/412
[51] Int. Cl. ...................................................... G01v 1/04
[50] Field of Search ............................................ 181/0.5
 VM; 91/426, 434, 412

[56] References Cited
UNITED STATES PATENTS

| 2,431,187 | 11/1947 | Meyers ........................ | 121/39 |
| 3,260,273 | 7/1966 | Hayner ........................ | 137/85 |

*Primary Examiner*—Rodney D. Bennett, Jr.
*Assistant Examiner*—Brian L. Ribando
*Attorneys*—James O. Dixon, Andrew M. Hassell, Harold Levine, Melton Sharp and Rene E. Grossman ABSTRACT: A control system includes a valve that alternately energizes one end of a main hydraulic cylinder to raise a gas gun, energizes the other end of the cylinder to raise a gas gun truck and drains both ends to permit gun or truck free fall. A control cylinder coupled in parallel with the main cylinder prevents actuation of the valve to raise the gun when the truck is raised, and vice versa. Truck free fall is initiated by a kickoff cylinder which operates on the main cylinder. The rate of both gun and truck free fall is controlled by orifices.

PATENTED NOV 16 1971

INVENTORS:
HERBERT D. COBURN
GILBERT H. KELLY

INVENTORS:
HERBERT D. COBURN
GILBERT H. KELLY

CONTROL SYSTEM

BACKGROUND OF THE INVENTION

In the petroleum exploration industry, seismic waves are generated by a variety of devices, one of which is a gas gun Typically, a gas gun comprises a cylinder having a large piston mounted in it. In use, a mixture of propane and oxygen is fed into the cylinder. When the mixture is ignited, the piston is driven into engagement with the earth. As the piston strikes the earth, a seismic wave is generated.

Ordinarily, a gas gun is mounted on a truck for transportation to exploration sites. When a seismic wave is to be generated, a hydraulic system is actuated to lower the gas gun into engagement with the earth and to raise the truck off of the earth so that the gas gun is held against the earth by the weight of the truck. After the seismic wave has been generated, the hydraulic system is actuated to lower the truck into engagement with the earth and to raise the gas gun into a transportation position.

In the past, gas gun raising and lowering hydraulic systems have been operated by valves that permit the gas gun to be driven under power from the transportation position to the earth-engaging position and from the earth-engaging position to the transportation position. This action alternately slams the gas gun and the truck into engagement with the earth with resulting damage to the gas gun, to the truck, or both. This invention relates to a gas gun raising and lowering control system in which truck raising power cannot be applied to the hydraulic system while the system is in the gun-up mode, and vice versa. The invention may be used in other control systems to prevent abrupt reversals of the application of power to any device.

SUMMARY OF THE INVENTION

In the preferred embodiment, this invention comprises the control system in which a control member is energized in response to the energization of a motor and in which energization of the control member prevents reverse energization of the motor. In accordance with a specific embodiment of the invention, the motor is the hydraulic cylinder and the control member is a hydraulic cylinder connected in parallel with the hydraulic cylinder and connected to an energization valve for the hydraulic cylinder.

DESCRIPTION OF THE DRAWINGS

A more complete understanding of the invention may be had by referring to the following detailed description when taken in conjunction with the drawings, wherein.

DETAILED DESCRIPTION

Figure 1:
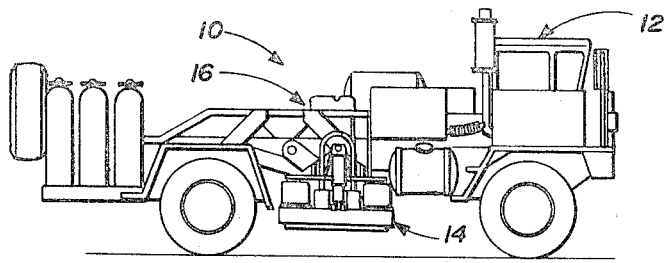
FIG. 1 is a side view of a truck mounted, gas gun type seismic wave generating system showing the system in the gun-up position.
Figure 2:
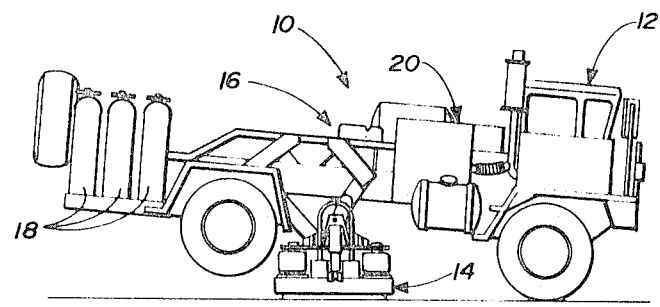
FIG. 2 is a view similar to FIG. 1 showing the system in the truck-up position.

Referring now to the drawings, and particularly to FIGS. 1 and 2 thereof, there is shown a seismic wave generating system 10 including a truck 12 and a gas gun 14 which is supported on the truck 12 by a truck and gun raising and lowering system 16. In FIG. 1, the system 10 is illustrated in the transportation or gun-up position. In FIG. 2 the system 10 is illustrated in the seismic wave generating or truck-up position. In this position, the gas gun 14 is urged into engagement with the earth by the weight of the truck 12.

In use, the gun and truck raising and lowering system 16 is initially operated to position the gas gun 14 in the gun-up position illustrated in FIG. 1 The truck 12 is operated to transport the gun 14 to a site at which a seismic wave is to be generated. The system 16 is then actuated to lower the gas gun 14 and to raise the truck 12, that is, to position the component parts of the system 10 in the truck-up position illustrated in FIG. 2.

When the gun and truck are positioned in the truck-up position, oxygen from a plurality of tanks 18 and propane from a cabinet 20 are fed into a cylinder in the gas gun 14. The propane and oxygen are ignited in the cylinder to drive the cylinder into engagement with the earth. This action generates a seismic wave.

When the generation of the seismic wave has been completed, the system 16 is actuated to lower the truck 12 and to raise the gas gun 14, that is, to position the component parts of the system 10 in the gun-up position illustrated in FIG. 1. The truck 12 is then operated to transport the gas gun 14 to another seismic wave generating site, whereat the seismic wave generation process is repeated.

Figure 3:
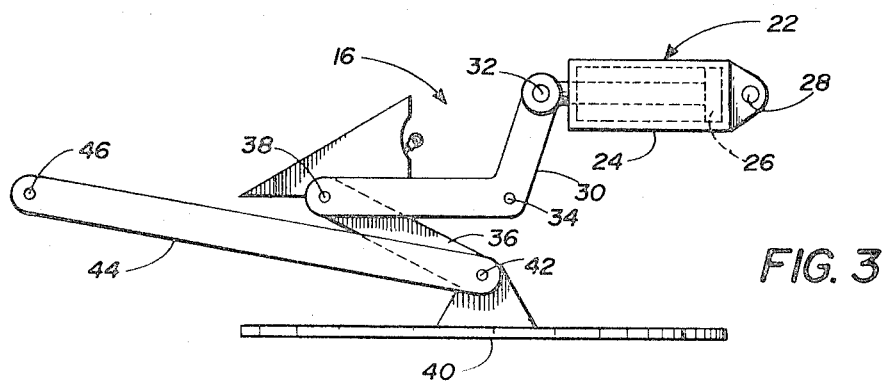
FIG. 3 is an enlarged side view of a portion of the gun and truck raising and lowering mechanism of the system shown in FIG. 1 showing the mechanism in the gun-up position.
Figure 4:
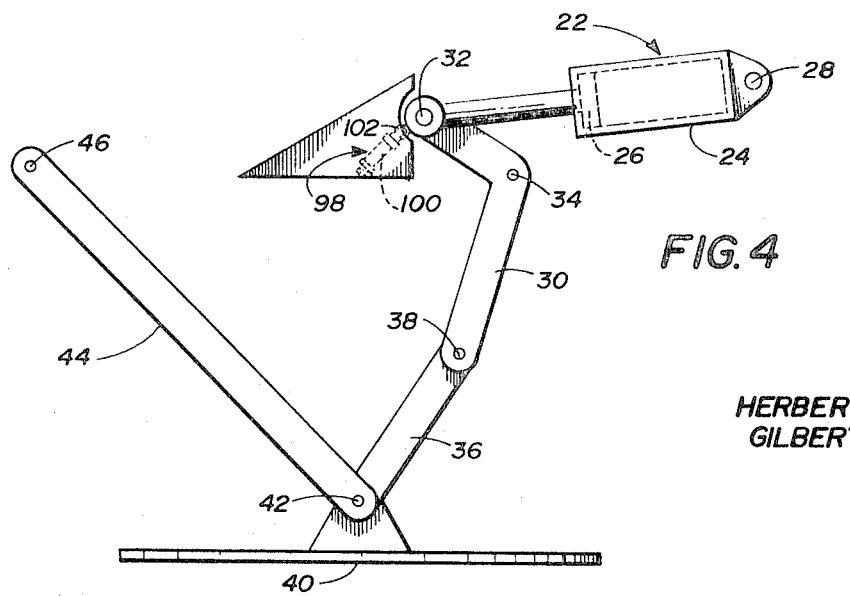
FIG. 4 is a view similar to FIG. 3 showing the mechanism in the truck-up position.

Referring now to FIGS. 3 and 4, the construction and operation of the gun and truck raising and lowering system 16 of the seismic wave generating system 10 are illustrated. The system 16 includes a main hydraulic actuator 22 comprising a cylinder 24 and a piston 26 slidably supported within the cylinder 24. The cylinder 24 is pivotally secured to the frame of the truck 12 by a pin 28. The piston 26 is pivotally secured to a bellcrank 30 by a pin 32.

The bellcrank 30 is pivotally supported on the frame of the truck 12 by a pin 34 and is pivotally attached to a link 36 by a pin 38. The link 36 is pivotally connected to a plate 40 comprising a portion of the gas gun 14 by a pin 42. An arm 44 is also pivotally secured to the plate 40 by the pin 42 and is pivotally secured to the frame of the truck 12 by a pin 46.

When the piston 26 of the actuator 22 is positioned in the position illustrated in FIG. 3, the gun and truck raising and lowering mechanism 16 is in the gun-up position. The mechanism 16 is actuated to the truck-up position. The mechanism 16 is actuated to the truck-up position by directing pressurized hydraulic fluid into the blind end of the cylinder 24. This drives the piston 26 out of the cylinder 26 which in turn pivots the bellcrank 30 counterclockwise about the pin 34. As the bellcrank 30 pivots counterclockwise, the pin 38 is driven in an arc about the pin 34.

As the pin 38 moves about the pin 34, the link 36 and the arm 44 cooperate to move the plate 40 downwardly. This action moves the system 16 into the truck-up position. As the piston 16 reaches the rod end of the cylinder 24, the pin 38 moves beyond a straight line extending between the pin 34 and the pin 42. As is illustrated in FIG. 4, this action positions the system 16 in an overcenter or toggle lock position.

In the toggle position, the weight of the truck 12 urges the pin 38 to pivot farther about the pin 34. This action is prevented, however, by the engagement of the piston 26 with the rod end of the cylinder 24. Therefore, when the system 16 is in the truck-up position illustrated in FIG. 4, the component parts of the system 16, rather than pressurized hydraulic fluid in the cylinder 24, maintain the gun 14 and the truck 12 in the truck-up position.

Figure 6:
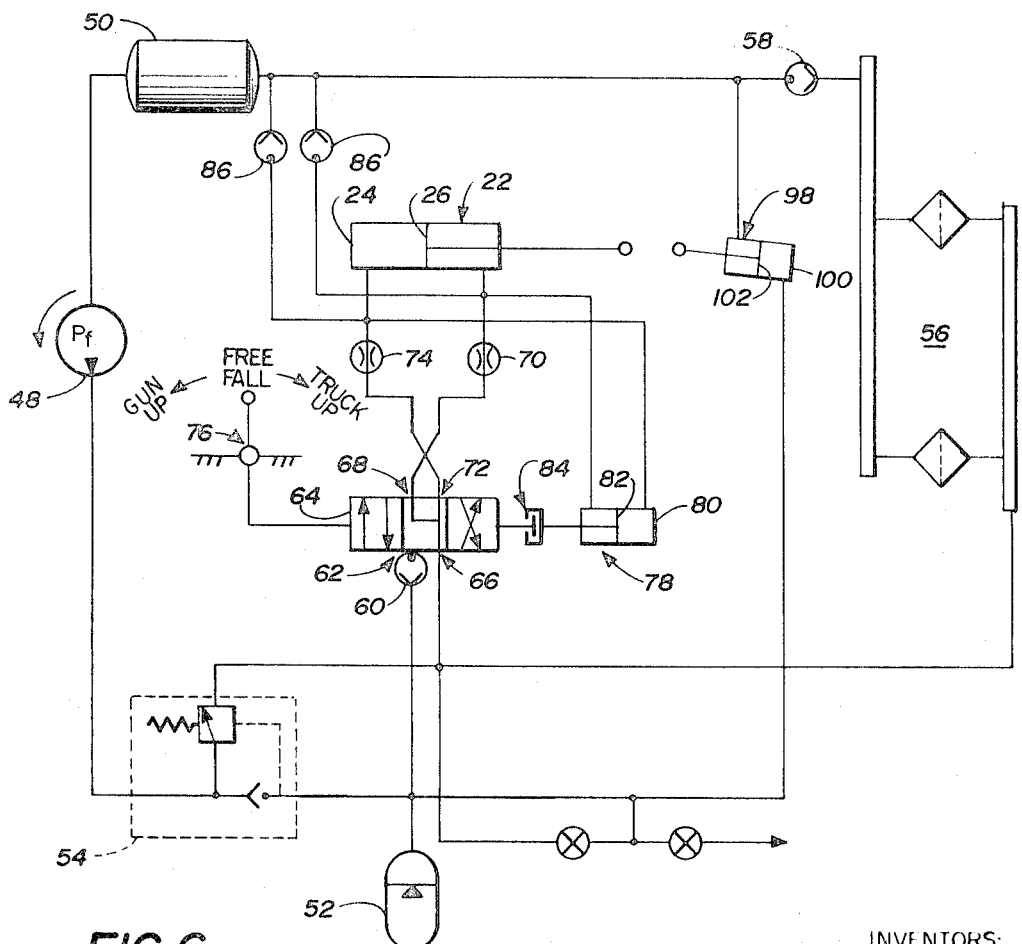
FIG. 6 is a schematic illustration of a gun and truck raising and lowering mechanism control system employing the invention.

Referring now to FIG. 6, a system for operating and controlling the system 16 is schematically illustrated. A pump 48 draws hydraulic fluid from a sump 50 and supplies hydraulic fluid under pressure to an accumulator 52 through an accumulator pressurizing system 54. The system 54 maintains a predetermined pressure in the accumulator 52. Any hydraulic fluid from the pump 48 not necessary to maintain the predetermined pressure in the accumulator 52 is returned by the system 54 to the sump 50 through a filter system 56. A check valve 58 prevents the reverse flow of hydraulic fluid through the filter system 56.

The accumulator 52 is connected through a check valve 60 to a first port 62 of a three position, four-way valve 64. A second port 66 of the valve 64 is connected to the sump 50 through the filter system 56 and the check valve 58. A third port 68 of the valve 64 is connected through an orifice 70 to the rod end of the cylinder 24 of the actuator 22. A fourth port 72 of the valve 64 is connected through an orifice 74 to the blind end of the cylinder 24.

The valve 64 is operated between its three positions by a lever 76 mounted for actuation by the operator of the truck 12. As is indicated in FIG. 6, the lever 76 has three positions, i.e., "gun-up," "free fall" and "truck-up."

When the lever 76 is actuated to the gun-up position, the valve 64 connects the port 62 to the port 68 and connects the port 66 to the port 72. This permits hydraulic fluid to flow from the accumulator 52 through the valve 64 and the orifice 70 to the rod end of the cylinder 24. Hydraulic fluid from the blind end of the cylinder front 24 flows through the orifice 74 and the valve 64 to the sump 50 by way of the filter system 56 and the check valve 58.

When the lever 76 is actuated to the free fall position the valve 64 connects both the port 68 and the port 72 to the port 66. This connects both ends of the cylinder 24 to the sump 50 through the orifices 74 and 70, the valve 64, the filter system 56 and the check valve 58. When the lever 76 is in the free fall position, the port 62 and, therefore, the accumulator 52, is blocked.

When the lever 76 is actuated to the truck up position, the valve 64 connects the port 62 to the port 72 and connects the port 66 to the port 68. This connects the accumulator 52 to the blind end of the cylinder 24 through the valve 64 and the orifice 74. Also, movement of the lever 76 to the truck-up position connects the rod end of the cylinder 24 to the sump 50 through the orifice 70, the valve 64, the filter system 56 and the check valve 58.

The operation of the lever 76 to position to valve 64 is controlled by a control mechanism 78. The control mechanism includes a hydraulic cylinder 80 fixed to the frame of the truck 12 and a piston 82 slidably supported within the cylinder 80. Each end of the cylinder 78 is connected directly to corresponding end of the cylinder 24. That is, the mechanism 76 is coupled in parallel with the actuator 22. Thus, whatever pressure is applied to the blind end of the cylinder 22 by the valve 64 is applied to the blind end of the cylinder 80 through the connection between the actuator 22 and the control mechanism 76. Likewise, whatever pressure is applied to the rod end of the cylinder 24 is applied to the rod end of the cylinder 80.

The piston 82 of the mechanism 78 is coupled to the valve 64 through a slip joint 84. The slip joint 84 cooperates with the parallel coupling between the cylinder 78 and the cylinder 24 to permit actuation of the lever 76 to position the valve 64 in the free fall position regardless of the position of the valve 64 and to prevent actuation of the lever 76 to position the valve 64 in the truck-up position when the cylinder 24 is actuated to the gun-up position and vice versa.

For example, assume the lever 76 is in the gun-up position. When the lever 76 is in the gun-up position the accumulator 52 is coupled to the rod end of the cylinder 24 and the pressure of the accumulator 52 is applied to the rod end of the cylinder 80 through the parallel connection between the actuator 22 and the control mechanism 78. If the operator of the truck 12 attempts to actuate the lever 76 from the gun-up position to the truck-up position, the slip joint 84 permits actuation of the lever 76 to the free fall position. However, movement of the lever 76 to the free fall position takes up all of the slack provided by the slip joint 84. Thus, further movement of the lever 76 requires movement of the piston 82 toward the rod end of the cylinder 80. Since the parallel connection between the actuator 22 and the control mechanism 78 applies the pressure of the accumulator 52 to the rod end of the cylinder 80, movement of the piston 82 toward the rod end of the cylinder 80 is prevented. Thus, the slip joint 84 and the control mechanism 78 cooperated to prevent movement of the lever 76 directly from the gun-up position to the truck-up position while permitting movement of the lever 76 to the free fall position.

Likewise, if the lever 76 is in the truck-up position, the pressure of the accumulator 52 is applied to the blind end of the cylinder 80 through the parallel connection between the actuator 22 and the control mechanism 78. The pressure of the accumulator 52 in the blind end of the cylinder 80 prohibits movement of the piston 82 toward the blind end of the cylinder 80 and thereby prevents actuation of the lever 76 directly from the truck-up position to the gun-up position.

Regardless of whether the lever 76 is in the gun-up position or the truck-up position, the slip joint 84 always permits movement of the lever 76 to the free fall position. Whenever the lever 76 is in the free fall position, the valve 64 connects both ends of the cylinder 24 to the sump 50 through the orifices 70 and 74. Assuming that the lever 76 is moved to the free fall position from the gun-up position, the interconnection of the rod end of the cylinder 24 and the sump 50 drains the rod end of the cylinder 24 at a rate controlled by the orifice 70. As the rod end of the cylinder 24 drains, hydraulic fluid flows into the blind end of the cylinder 24 through one of a pair of check valves 86.

Similarly, if the lever 76 is moved to the free fall position from the truck-up position, the blind end of the cylinder 24 drains into the sump 50 at a rate controlled by the orifice 74. As the blind end of the cylinder 24 drains, the rod end of the cylinder 24 receives hydraulic fluid from the sump 50 through the other of the check valves 86. Thus, whenever the lever 76 is moved to the free fall position, the end of the cylinder 24 that was formerly pressurized is drained to the sump 50 while the other end of the cylinder 24 fills with hydraulic fluid from the sump 50.

The parallel connection between the actuator 22 and the control mechanism 78 brings the pressures at the ends of the cylinder 80 into equilibrium as the pressures in the ends of the cylinder 24 are equalized. When both ends of the cylinder 80 are at the same pressure, the piston 82 can easily be moved in either direction in the cylinder 78. At this time, the lever 76 can be actuated to move the valve 64 to either the gun-up position or the truck-up position as desired by the operator of the truck 12.

Figure 5:
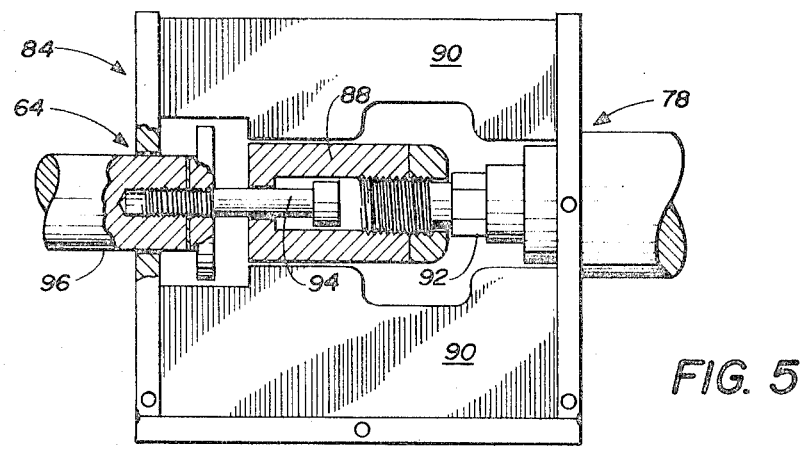
FIG. 5 is a side view of another portion of the gun and truck raising and lowering mechanism of the system shown in FIG. 1 in which certain parts have been broken away more clearly to illustrate certain features of the invention.

The details of the slip joint 84 are illustrated in FIG. 5. A cylinder 88 is mounted between pair of guide members 90 fixed to the frame of the truck 12 and is threadedly engaged with an extension 92 of the piston 82 of the control mechanism 78. A piston 94 is loosely received in the interior of the cylinder 88 and is threadly engaged with an extension 96 of the valve 64.

Since the cylinder 88 is connected to the extension 92, its position is dependent upon the position of the piston 82 in the cylinder 80. The position of the piston 82 is in turn dependent upon the relative pressures in the ends of the cylinder 80 as controlled by the parallel connection between the control mechanism 78 and the actuator 22. The cylinder 88 acts as a stop to prevent movement of the valve 64 beyond the free fall position when the piston 82 is engaged with either end of the cylinder 80. The threaded connections between the cylinder 88 and extension 92 and between the piston 94 and the extension 96 are so adjusted that the valve 64 can always be moved to the free fall position but cannot be moved to the gun-up position when the piston 24 is in the truck-up position, and vice versa.

Referring now to FIGS. 4 and 6, a system for initiating free fall of the truck and gun raising and lowering system 16 when the actuator 22 is in the truck-up position as illustrated. As is most clearly shown in FIG. 4, actuation of the piston 26 to the truck-up position moves the linkage between the piston 26 and the gas gun 14 onto an over center or toggle position. Thus, simply actuating the lever 76 to move the valve 64 to the free fall position and thereby equalizing the pressure at the ends of the cylinder 24 will not initiate free fall of the truck 12.

To this end, a kickoff mechanism 98 is provided for initiating free fall of the truck 12. The mechanism 98 is comprised of a cylinder 100 and a piston 102. As is shown in FIG. 6, the accumulator 52 is connected directly to the blind end of the cylinder 100. The rod end of the cylinder 100 is connected directly to the sump 50. Therefore, the piston 102 is continuously urged toward the piston 26 of the actuator 22.

The piston 26 is relatively large compared with the piston 102. Therefore, when the piston 26 is actuated to the truck-up position, the piston 26 simply drives the piston 102 toward the blind end of the cylinder 100 against the action of the hydraulic pressure from the accumulator 52.

As long as the blind end of the cylinder 24 remains connected to the accumulator 52, the piston 102 cannot move toward the rod end of the cylinder 100. However, when the lever 76 is actuated to move the valve 64 to the free fall position and the blind end of the cylinder 24 is thereby connected to the sump 50 through the orifice 74, the hydraulic pressure from the accumulator 52 drives the piston 102 toward the rod end of the cylinder 100.

Referring again to FIG. 4, movement of the piston 102 under the action of the pressure from the accumulator 52 results in movement of the piston 26 toward the blind end of the cylinder 24. The kickoff mechanism 98 has a sufficient stroke to move the piston 26 to a point whereat the toggle in the linkage between the piston 26 and the gas gun 14 is broken. Thereafter, free fall of the truck 12 continues under the weight of the truck.

In use, the lever 76 is actuated to the free fall position whenever a seismic wave is to be generated. As hydraulic fluid from the rod end of the actuator 22 drains through the orifice 70, the gas gun 14 sinks toward the earth under the action of gravity. The rate of downward movement of the gas gun 14 is controlled by the rate at which hydraulic fluid drains from the cylinder 24 which is in turn controlled by the size of the orifice 70.

When the gas gun 14 is in engagement with the earth, the lever 76 is actuated to the truck-up position. This connects the accumulator 52 to the blind end of the cylinder 24 through the valve 64 and simultaneously moves the piston 82 to the rod end of the cylinder 80. As the blind end of the cylinder 24 fills with hydraulic fluid, the piston 26 is driven to the rod end of the cylinder 24.

Movement of the piston 26 toward the rod end of the cylinder 24 actuates the raising and lowering system 16 to move the truck 12 to the truck-up position. As the piston 26 reaches the end of its travel it engages the piston 102 of the kickoff mechanism 98 and drives the piston 102 toward the blind end of the cylinder 100 against the pressure of the accumulator 52. Also, as the accumulator 52 fills the blind end of the cylinder 24, the parallel connection between the actuator 22 and the control mechanism 78 applies the pressure of the accumulator 52 to the blind end of the cylinder 80. This prevents the lever 76 from being moved directly from the truck-up position to the gun-up position.

After a seismic wave has been generated, the lever 76 is moved from the truck-up position to the free fall position. This drains the blind end of the cylinder 24 through the orifice 74. As the pressure in blind end of the cylinder 24 drops, the kickoff mechanism 98 initiates free fall of the truck 12 by driving the piston 26 toward the blind end of the cylinder 24. When the toggle in raising and lowering system 16 has been broken by the kickoff mechanism 98, the truck 12 descends into engagement with the earth under the action of gravity. The rate of descent of the truck 12 is dependent upon the rate of flow of hydraulic fluid out of the blind end of the cylinder 24 which is in turn controlled by the size of the orifice 74.

When the truck 12 is engaged with the earth, the lever 76 is actuated to the gun-up position. This connects the accumulator 52 to the rod end of the cylinder 24 through the valve 64 and simultaneously moves the piston 82 to the blind end of the cylinder 80. As hydraulic fluid flows into the rod end of the cylinder 24, the piston 26 is driven toward the blind end of the cylinder 24. This actuates the raising and lowering mechanism 16 to raise the gas gun 14 to the gun-up position. Simultaneously, the parallel connection between the actuator 22 and the control mechanism 78 applies the pressure of the accumulator 52 to the rod end of the cylinder 80 so that the lever 76 cannot be moved directly from the gun-up position to the truck-up position.

The control system illustrated in the drawing has several important advantages over prior systems. First, the use of the control mechanism requires that both the gun and the truck come to rest on the earth before the valve can be operated to either the truck-up or the gun-up position. This prevents the operator of the system from driving either the truck or the gas gun into engagement with the earth under the combined power of the hydraulic system and gravity and thereby prevents damage to the component parts of the system. Second, the use of the orifices to control the rate of free fall prevents the truck and the gun from slamming into engagement with the earth under the action of gravity alone.

Third, the arrangement of the free fall portion of the valve together with the use of check valves between the main cylinder and the sump eliminates the use of accumulator oil to fill one end of the main cylinder as to the other end is drained. By this means, the full power of the accumulator is available to raise the truck or the gun after the gun and the truck come to rest on the earth. This greatly increases the frequency at which seismic waves can be generated because it eliminates the necessity of waiting for the pump to recharge the accumulator after a free fall operation. Fourth, the toggle mechanism in the gun and truck raising and lowering mechanism and the kickoff mechanism cooperate to lock the truck in the raised position without the use of hydraulic pressure while providing for truck free fall under the action of gravity.

Although the control system illustrated in the drawing is designed for use with a particularly gun and truck raising and lowering mechanism, it will be understood that the parts thereof may be redesigned and rearranged to accommodate other truck and gun raising and lowering system designs. Additionally, the basic concept underlying the control system can be employed with mechanisms other than hydraulic cylinders. For example, many two-directional electric motors are controlled by switches having forward, off and reverse positions. The control system according to the present invention can be employed to control the operation of such switches by coupling a solenoid in parallel with the electric motor and by connecting the plunger of the solenoid to the switch through a slip joint.

Although one embodiment in the invention is illustrated in the accompanying drawings, and described in the foregoing specification, it will be understood that the invention is not limited to the embodiment disclosed but is capable of rearrangement, substitution and modification of parts and elements without departing from the spirit of the invention.

What is claimed is:

1. A control system, comprising:
    an output cylinder;
    a control cylinder;
    means for connecting the control cylinder in parallel with the output cylinder so that the same pressure is applied to both cylinders;
    means for alternately pressurizing opposite ends of the output cylinder and thereby alternately producing each of two outputs;
    a directing means, and
    means interconnecting the control cylinder and the directing means for preventing operation of the directing means to pressurize one end of the output producing cylinder whenever the other end of the output-producing cylinder is pressurized.

2. The control system according to claim 1 wherein the pressurizing means includes means for releasing pressure from both ends of the output cylinder and wherein the interconnecting means includes means for permitting operation of the directing means to release pressure from both ends of the output cylinder regardless of whether either end of the output cylinder is pressurized.

3. The control system according to claim 1 wherein the pressurizing means includes a three-position valve that alternately directs a fluid under pressure to one end of the output cylinder, drains both ends of the output cylinder and directs the fluid to the other end of the output cylinder and wherein the interconnecting means includes a lost motion link that permits actuation of the valve to drain the cylinder but prevents actuation of the valve to direct the fluid to one end of the cylinder when the other end is pressurized.

4. The control system according to claim 3 wherein the lost motion link is a slip joint connected between the valve and the control cylinder.

5. In a seismic wave generating system of the type including a vehicle, a seismic wave generating head, a cylinder for raising and lowering the head with respect to the vehicle and a valve for controlling the operation of the cylinder, said valve having three positions, one for energizing the cylinder to raise the head with respect to the vehicle, one for deenergizing both ends of the cylinder and one for energizing the cylinder to raise the vehicle with respect to the head, and a control system comprising:

a control cylinder;

means for connecting the control cylinder in parallel with the head raising and lowering cylinder, and means interconnecting the control cylinder and the valve for restricting operation of the valve whenever the control cylinder is energized, said restricting means prevents operation of the valve to the vehicle raising position whenever the head is raised, prevents operation of the valve to the head raising position whenever the vehicle is raised and permits operation of the valve to the deenergizing position at any time.

6. The system according to claim 5 further including at least one orifice for controlling the deenergization of the cylinder when the valve is in the deenergizing position.

7. The system according to claim 6 further including a kickoff mechanism for initiating lowering of the vehicle when the vehicle is in the raised position and the valve is in the deenergizing position.

8. The system according to claim 1 wherein the kickoff mechanism includes a cylinder having a piston mounted for engagement with the piston of the raising and lowering cylinder when the vehicle is in the raised position.

* * * * *